Feb. 25, 1969            D. G. SCOTT            3,429,620

FLUID PRESSURE BRAKE CONTROL VALVE APPARATUS WITH
SELECTIVE DIRECT OR GRADUATED RELEASE FUNCTION

Filed June 20, 1967            Sheet 1 of 2

INVENTOR.
DANIEL G. SCOTT
BY
*A. A. Steinmiller*
ATTORNEY

United States Patent Office 3,429,620
Patented Feb. 25, 1969

3,429,620
FLUID PRESSURE BRAKE CONTROL VALVE APPARATUS WITH SELECTIVE DIRECT OR GRADUATED RELEASE FUNCTION
Daniel G. Scott, Apollo, Pa., assignor to Westinghouse Air Brake Company, Wilmerding, Pa., a corporation of Pennsylvania
Filed June 20, 1967, Ser. No. 647,440
U.S. Cl. 303—36      15 Claims
Int. Cl. B60t *15/52, 15/54*

ABSTRACT OF THE DISCLOSURE

A brake control valve device, for railway cars, of the so-called "direct-release" type, such as the Westinghouse Air Brake Company's ABD control valve, having a new and improved graduated release valve device to provide for optionally effecting either a direct release of the brakes or a graduated release of the brakes dependent on the rate at which recharging of the brake pipe is effected incidental to effecting a brake release.

---

A graduated release type of brake control valve device is desirable on the cars in all types of railway trains. Inherently, a graduated release type of brake control valve device provides for releasing fluid under pressure from the brake cylinder device correspondingly as the pressure in the train brake pipe is increased. Passenger trains seldom exceed, for example, twenty cars in length whereas freight trains often exceed one hundred and fifty cars in length. Normal brake pipe leakage on freight trains of such great length necessitates considerable time to effect a sufficient increase, usually one and one-half p.s.i., in the pressure in the brake pipe with respect to the pressure remaining in the auxiliary reservoir on those cars near and at the back or caboose end of the train to cause a direct release of the brakes on these cars.

In contrast, for a complete release of brakes with a graduated release type brake control valve device, approximately 20 p.s.i. increase in brake pipe pressure would be required. Accordingly, in view of the much longer time required to effect build-up of brake pipe pressure to 20 p.s.i. as compared to 1½ p.s.i., graduated release type brake control valve devices have heretofore been widely used only on passenger type railway vehicles since passenger trains seldom exceed twenty cars in length as aforestated.

Most modern freight cars are provided with either the above-mentioned ABD control valve device or the well-known AB control valve device. Since both of these control valve devices are of the "direct-release" type, under certain service conditions, for example, when a freight train, all cars of which are provided with one or the other of these types of control valve devices, must descend one or more long grades, it is necessary to stop the train prior to descending each grade and to manually adjust a retaining valve device on each car in the train to continuously retain during the descent at least a chosen pressure in the brake cylinder device associated with the control valve device on each car in the train to prevent loss of control of the train by the engineer when he effects a brake release and recharging of the brake equipment and a reapplication of the brakes, the release and recharging being necessary to replenish the brake equipment with fluid under pressure lost by leakage during the descent. Furthermore, upon completing the descent of the grade, it is again necessary to stop the train and manually adjust the retaining valve device on each car to effect a complete release of fluid under pressure from the corresponding brake cylinder device to prevent dragging of the brake shoes against the wheels of the freight cars and thereby causing undue brake shoe wear, until the train reaches the next descending grade.

Accordingly, it is the general purpose of this invention to provide an improved ABD type of control valve device having the provision of means whereby optionally, at the discretion of the engineer, either a graduated release or a direct release of the brakes may be obtained on freight trains appropriately equipped.

More specifically, according to the invention, an ABD type control valve device is provided which comprises a graduated release valve device and an emergency reservoir charging cut-off valve device, which may be selectively cut-in for subjecting the graduated release valve device to control by variations in either the pressure in the brake pipe or in the auxiliary reservoir acting in conjunction with brake cylinder pressure in opposition to a constantly maintained emergency reservoir pressure. As illustratively shown, the graduated release valve device together with the emergency reservoir charging cut-off valve device are embodied in a filling piece which may be disposed between the customary pipe bracket portion and the service valve portion of the ABD control valve device with a minimum of expense and skill thereby enabling ready conversion of existing ABD control valve devices to provide the graduated release function.

The operation of the conventional accelerated service release valve of the ABD control valve device responsive to a rapid rate of recharge of brake pipe pressure causes rapid equalization of emergency reservoir and brake pipe pressures in the graduated release valve device, which is thereby maintained in brake cylinder venting position for complete rapid release of the brakes once the service valve attains its release position. However, on a slow rate of recharge of the brake pipe, the accelerated service release valve does not respond to effect equalization of emergency reservoir and brake pipe pressures. In this case, the emergency reservoir pressure remains effective as a control or reference pressure in the graduated release valve device which accordingly operates responsively to build up of brake pipe pressure to release brake cylinder pressure only to the degree of amount of increase in brake pipe pressure.

Furthermore, three manually positioned selectable means are provided for respectively (1) subjecting the graduated release valve device to control by variations of pressure in either the brake pipe or in the auxiliary reservoir acting in conjunction with brake cylinder pressure in opposition to the constantly maintained emergency reservoir pressure, (2) for cutting out the graduated release valve device to thereby convert the control valve device constituting the present invention from a combined direct and graduated release type of control valve device to only a direct release type of control valve device, and (3) cutting the conventional accelerated service release valve of the ABD control valve out of operation. The graduated release valve device is cut-in or cut-out by the aforesaid means in clause (2).

Figure 1:
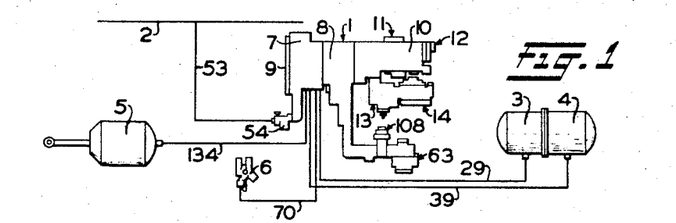
FIG. 1 is a diagrammatic view, in outline, showing a railway freight car brake equipment that includes a novel brake control valve device embodying the invention.

Referring to FIG. 1 of the drawings, the railway freight car brake equipment embodying the invention comprises a brake control valve device 1 to the pipe bracket of which is connected the usual brake pipe 2, an auxiliary reservoir 3, an emergency reservoir 4, a brake cylinder device 5, and a retaining valve device 6.

The brake control valve device 1 comprises a pipe bracket 7 to the opposite faces of which is secured in sealed relation therewith, a filling piece 8 having a valve device for providing a graduated release function, and a blanking pad 9, respectively. Secured to the filling piece 8 is a service portion 10.

The service portion 10 (FIG. 2) comprises a service valve device 11, an accelerated service release valve mechanism 12, a manually operative reservoir release valve device 13, and a brake cylinder release valve device 14.

The manually operative reservoir release valve device 13 and the brake cylinder release valve device 14 may be substantially the same in construction and operation as the corresponding brake cylinder release portion 10 shown in Patent 3,232,678 issued Feb. 1, 1966 to William G. Wilson and assigned to the assignee of the present application. Hence a detailed description of these valve devices is believed to be unnecessary since they form no part of the present invention.

Figure 2:
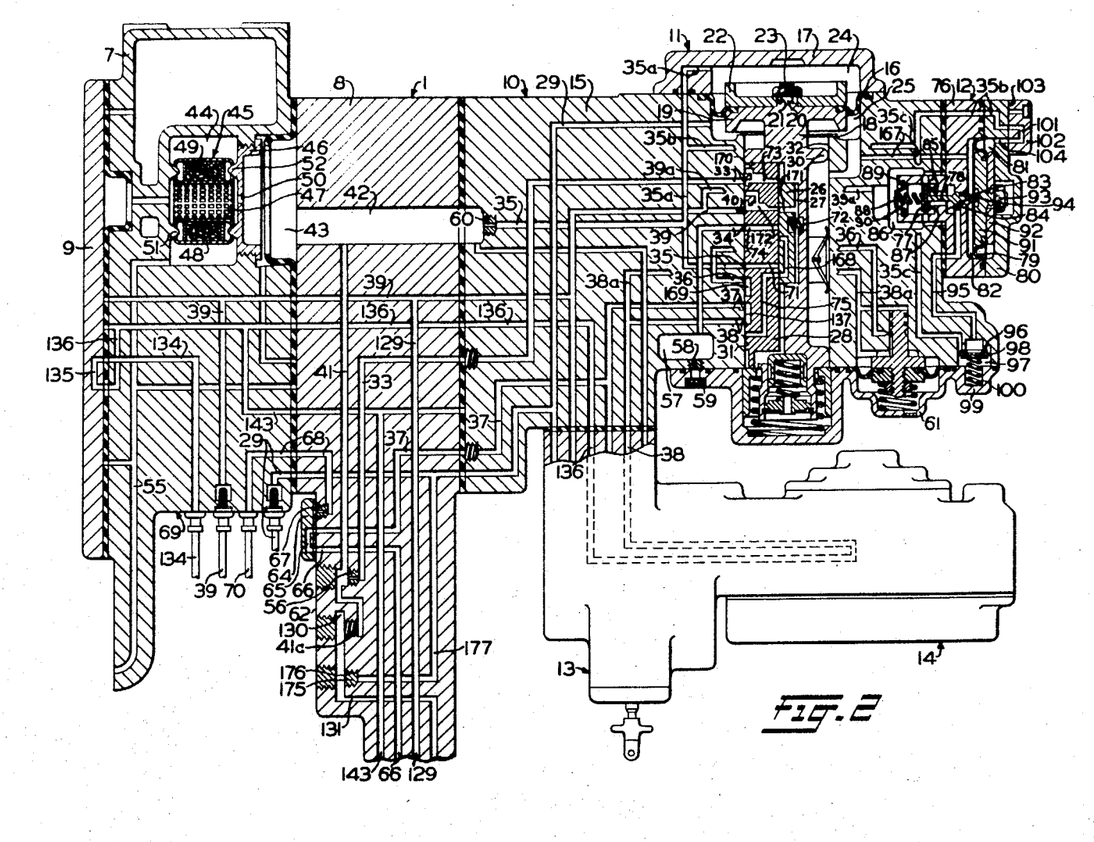
FIG. 2 is a diagrammatic view, mainly in section of an improved ABD type of brake control valve device embodying the invention showing the various parts thereof in their normal release position.

The service valve device 11 comprises a body or casing section 15 which is secured to the right-hand side of the filling piece 8 by any suitable means (not shown), and a diaphragm 16 that has its outer periphery clamped between the upper end of the casing section 15 and a cover member 17 secured to the casing section 15 by any suitable means (not shown).

The inner periphery of the diaphragm 16 is operatively connected to one end of a valve operating or service piston stem 18 having at its upper end a diaphragm follower 19 and a screw threaded stem follower 20 that extends through a bore 21 formed in a diaphragm follower plate 22 for receiving in screw-threaded engagement therewith a nut 23 which serves to clamp the inner periphery of the diagram 16 between the diaphragm follower 19 and follower plate 22.

The diaphragm 16 cooperates with the casing section 15 and cover member 17 to form within the service valve device 11 and on the respective opposite sides of the diaphragm two chambers 24 and 25. The chamber 25 contains the stem 18 which is adapted to operate a graduating valve 26 that is disposed in a recess 27 in the stem 18 and a service slide valve 28 also contained in this chamber 25 which chamber is connected to the auxiliary reservoir 3 (FIG. 1) via a passageway 29 (FIG. 2) extending through the casing section 15, filling piece 8 and pipe bracket 7 and a pipe bearing the same numeral.

The valve operating stem 18 is provided adjacent the diaphragm follower 19 with a guide member 30 which is slidably mounted between a service slide valve seat 31 and a wall surface 32 formed on the casing section 15. The purpose of the guide member 30 is to give a stabilizing effect to the diaphragm 16 and prevent the service slide valve 28 from being raised from its seat 31 by fluid under pressure in the ports opening at the surface of this seat upon which the slide valve 28 is slidably mounted.

As shown in FIG. 2 of the drawings, there are six passageways opening through respective corresponding ports at the face of the slide valve seat 31, the passageways and ports being respectively designated by the numerals 33, 34, 35, 36, 37 and 38. A seventh passageway 39 also opens through a corresponding port at the face of the slide valve seat 31. This port is closed by a plug 40 which is press-fitted into this port.

The port 33 is connected by its correspondingly numbered passageway in the slide valve seat 31, the casing section 15 and the filling piece 8 to a passageway 41 formed in the filling piece 8. One end of this passageway 41 opens into a large passageway 42 extending horizontally, as shown in FIG. 2, through the filling piece 8. The left-hand end of this passageway 42 opens into a chamber 43 within the pipe bracket 7.

There is also formed in the pipe bracket 7 a chamber 44 open at one end and containing a strainer device 45 which is inserted through the open end of the chamber, and which is secured to the pipe bracket 7 by means of a screw plug 46 having a screw-threaded connection with the bracket. Such a strainer device is described and claimed in Patent 2,014,895, issued Sept. 17, 1935 to Ellis E. Hewitt, which patent is assigned to the assignee of the present application. Briefly, however, the strainer device 45 comprises a perforated tubular retainer 47 and a perforated tubular retainer 48 which surrounds the retainer 47. The space between these retainers 46 and 47 is packed with hair 49 or any other material suitable for separating dirt, moisture or the like from a stream of fluid under pressure. The inner surface of the retainer 47 defines a passageway which is open to the chamber 43 through a restricted port or choke 50 in the screw plug 46. The inner wall of the chamber 44 is provided with an annular ring 51 and the screw plug 46 is provided with a similar ring 52 between which rings the strainer device 45 is clamped by the screw plug 46.

The brake pipe 2 (FIG. 1) is connected to the chamber 44 (FIG. 2) through a branch pipe 53 (FIG. 1), a combined cut-out cock and centrifugal dirt collector 54, and a passageway 55 (FIG. 2) in the pipe bracket 7.

An auxiliary reservoir charging choke 56 is disposed in the passageway 33 adjacent the opening this passageway into the passageway 41 to control the rate of charging the chamber 25 to which the auxiliary reservoir 3 is connected by the passageway and corresponding pipe 29 in order that the faster rate of charging of the chamber 24 in a manner hereinafter explained in detail will maintain the diaphragm 16, stem 18, graduating valve 26 and service slide valve 28 in their release position shown in FIG. 2.

The port 34 is connected by its correspondingly numbered passageway in the slide valve seat 31, and the casing section 15 to a quick service volume chamber 57 in the casing section 15, which chamber is constantly open to atmosphere via a choke 58 and an insect excluder device 59.

The port 35 is connected by a correspondingly numbered passageway in the slide valve seat 31 and the casing section 15 to the passageway 42 in the filling piece 8. This passageway 42 in the filling piece 8 is open to the hereinbefore-mentioned chamber 43 in the pipe bracket 7 which is connected to the brake pipe 2 as hereinbefore described.

A first branch passageway 35a extending through the casing section 15 and the cover member 17 connects that portion of the passageway 35 in the casing section 15 to the chamber 24 above the diaphragm 16.

A second branch passageway 35b extending through the casing section 15 connects that portion of the first branch passageway 35a therein to the accelerated service release valve mechanism 12.

A choke 60, the size of which is greater than that of the choke 56, is disposed in that end of passageway 35 that opens into passageway 42 in the filling piece 8.

The port 36 is connected by its correspondingly numbered passageway in slide valve seat 31, and the casing section 15 to a conventional quick service valve device 61 which forms no part of the present invention.

The port 37 is connected by its correspondingly numbered passageway which extends through the slide valve seat 31, the casing section 15 and filling piece 8 to a port opening at a face 62 formed on the left-hand side of filling piece 8. This port is connected in a manner hereinafter described to the retaining valve device 6 (FIG. 1) or to a graduated release valve device 63 (FIGS. 1 and 3) which graduated release valve device is hereinafter described in detail.

It will be noted that while a cap member 64 is secured to the face 62 on the left-hand side of the filling piece 8 in the position in which it is shown in FIG. 2 of the drawings by any suitable means (not shown), a passageway 65 formed in this cap member 64 establishes a communication between the passageway 37 and a passageway 66 formed in the filling piece 8 one end of which passageway 66 opens at the face 62 on the left-hand side of filling piece 8 just beneath the location at which the one end of the passageway 37 opens at this face. The passageway 66 extends through the filling piece 8 to the graduated release valve device 63.

A brake cylinder exhaust choke 67 is disposed in that end of a passageway 68 in the filling piece 8 that opens at the face 62 on this filling piece. This passageway 68 extends through the pipe bracket 7 to a port opening at a face 69 (FIG. 2) on the bottom of the pipe bracket 7 into which port is received one end of a pipe 70 connected at its opposite end to the hereinbefore-mentioned pressure retaining valve device 6 (FIG. 1) which may be of the usual well-known construction, having a cut-out position in which fluid under pressure is adapted to be completely vented from the brake cylinder device 5 and also having a cut-in position in which it operates in the usual manner in releasing the brakes to retain a predetermined pressure in the brake cylinder device.

The port 38 (FIG. 2) is connected by its correspondingly numbered passageway in the slide valve seat 31, the casing section 15 and the reservoir release valve device 13 to the brake cylinder release valve device 14.

A branch passageway 38a extending through the casing section 15 connects that portion of the passageway 38 in the casing section 15 to the hereinbefore-mentioned quick service valve device 61.

It will here be noted that with the service valve device 11 in its normal release position, as shown in FIG. 2, fluid under pressure flows from the brake pipe 2 (FIG. 1) to the chamber 43 (FIG. 2) in the pipe bracket 7 via branch pipe 53 (FIG. 1), dirt collector 54, passageway 55 (FIG. 2), chamber 44, strainer device 45 and choke 50. As can be seen from FIG. 2, fluid pressure flows from the chamber 43 via the passageway 42, choke 60 and the passageway 35 extending through the casing section 15 to the corresponding port in the slide valve seat 31 and then through a first passageway 71 extending horizontally through the service slide valve 28, the right-hand of which passageway is blanked off or lapped by the graduating valve 26 which is biased against the right-hand face of the service slide valve 28 by a spring 72 interposed between the valve operating stem 18 and the right-hand side of the graduating valve 26.

Also, fluid under pressure flows from the chamber 43 via the passageway 42, choke 60, passageway 35 and a first branch passageway 35a to the chamber 24 above the diaphragm 16 to charge this chamber to the pressure carried in the brake pipe 2. Furthermore, while the service slide valve 28 and the graduating valve 26 occupy their normal release position, as shown in FIG. 2, fluid under pressure in the hereinbefore-mentioned chamber 43 in the pipe bracket 7 flows therefrom through passageway 42, passageway 41, the auxiliary reservoir charging choke 56, passageway 33 and a second passageway 73 extending horizontally through the service slide valve 28 to the chamber 25 at a rate controlled by the size of the choke 56. Fluid under pressure thus supplied to the chamber 25 flows therefrom through the passageway and corresponding pipe 29 to the auxiliary reservoir 3. Auxiliary reservoir 3 is thus charged with fluid up to brake pipe pressure.

The service slide valve 28 is further provided with a third passageway 74 extending horizontally through the service slide valve 28, the right-hand end of which passageway is blanked off or lapped by the graduating valve 26 while in the position shown in FIG. 2. While the service slide valve 28 occupies its release position shown in FIG. 2, the left-hand end of the passageway 74 therein is in alignment with the port 34 in the service slide valve 31.

The service slide valve 28 has formed therein a fourth passageway 75 one end of which, as can be seen from FIG. 2, opens at the surface of the right-hand face of the slide valve 28 at a location substantially above the location at which the other end of this passageway opens at the left-hand face of the service slide valve.

As shown in FIG. 2 of the drawings, the accelerated service release valve mechanism 12 comprises a casing section 76 which is secured to the casing section 15 of the service valve device 11 by any suitable means (not shown). This valve mechanism 12 further comprises a flat disc type valve 77 and a valve operating stem 78 which valve 77 is operable via fluid under pressure exerted on the right-hand side of a diaphragm 79 operably connected to the stem 78 and suitably clamped about its outer periphery to the casing section 76 by a clamping cover 80 attached to the casing section 76 by any suitable means (not shown).

Two chambers 81 and 82 are formed respectively on the opposite sides of the diaphragm 79. Chamber 82 is connected by a bore 83 to a first chamber 84 which in turn is connected by a coaxial bore 85 to a second chamber 86. Contained in the chamber 86 is the valve 77 which cooperates with an annular valve seat 87. This seat 87 is formed on the casing section 76, surrounds the left-hand end of the bore 85 therein and projects into the chamber 86. Between the left-hand face of the valve 77 and a spring seat 88 disposed in the chamber 86 against a snap ring 89 carried by the casing section 76 is a spring 90 for resiliently seating the valve 77 on the valve seat 87 to normally close communication between the chamber 86 and the bore 85. The valve operating stem 78 comprises two portions of unequal diameter the larger of which is slidably mounted in the bore 83. The right-hand end of the valve stem 78 extends into the chamber 82 and abuts the center of a diaphragm follower 91 between which and a diaphragm follower plate 92 secured thereto by a nut 93 is clamped the inner periphery of the hereinbefore-mentioned diaphragm 79.

That portion of the stem 78 having the larger diameter is provided intermediate its ends with an O-ring 94 disposed in a corresponding annular recess formed in the stem 78; said O-ring 94 having sealing and sliding contact with the wall of the bore 83 to minimize leakage of fluid under pressure from chamber 82 to the chamber 84 into which opens one end of a passageway 95 extending through the casing sections 76 and 15, the opposite end of which opens within an annular valve seat 96 to a chamber 97. Contained in chamber 97 is a flat disc-type valve 98 which cooperates with the annular valve seat 96. Between the valve 98 and a cover member 99 secured to the casing section 15 by any suitable means (not shown) and closing the open end of the chamber 97 is a spring 100 for resiliently seating valve 98 on seat 96 to normally close communication between the chamber 97 and the passageway 95.

The hereinbefore-mentioned second branch passageway 35b formed in the casing section 15 extends through the casing section 76, and clamping cover 80 to one end of a passageway 101 formed in a cap member 102 removably secured by any suitable means (not shown) to a face 103 formed on the right-hand side of the clamping cover 80. While this cap member 102 is secured to the face 103 in the position shown in FIG. 2 of the drawings, the passageway 101 in this cap member establishes a communication between the second branch passageway 35b and one end of a passageway 104 formed in the clamping cover 80 the opposite end of which passageway opens into the chamber 81 at the right-hand side of the diaphragm 79. A third branch passageway 35c in the casing section 15 connects the second branch passageway 35b to the chamber 97.

The hereinbefore-mentioned passageway 39, which extends through the casing section 15, filling piece 8, and pipe bracket 7 and is connected by a pipe bearing the same numeral to the emergency reservoir 4, is connected by a branch passageway 39a extending through the casing section 15, to the chamber 86. Consequently, fluid under pressure at emergency reservoir pressure is always present in the chamber 86.

Figure 3:
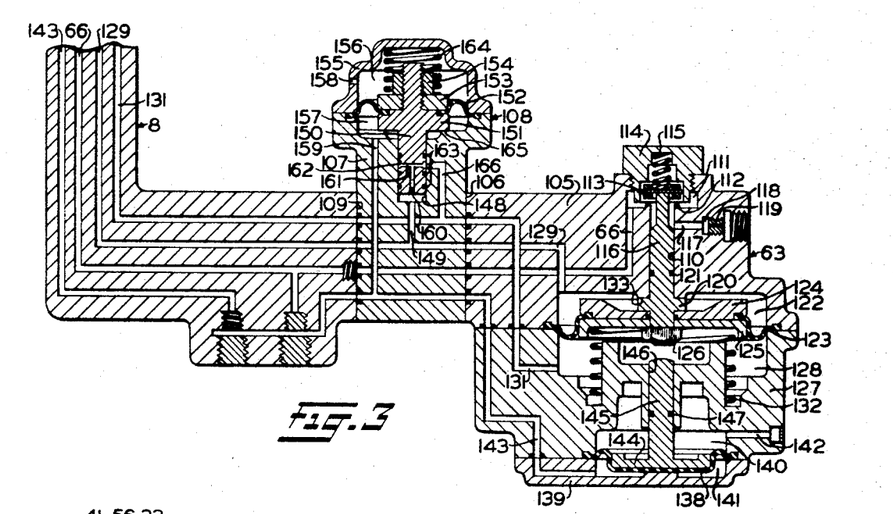
FIG. 3 is a diagrammatic view, on an enlarged scale, of the graduated release valve device and the emergency reservoir charging cut-off valve device that are included in the brake control valve device of the present invention, which graduated release valve device and emergency reservoir charging cut-off valve device are shown in outline in FIG. 1.

As shown in FIG. 3 of the drawings, the hereinbefore-mentioned graduated release valve device 63 is embodied in a sectionalized casing comprising a first casing section 105 which is secured by any suitable means (not shown) to a right-hand bolting face 106 formed on a casing 107 of an emergency reservoir charging cut-off valve device 108. This casing 107 in turn is secured by any suitable means (not shown) to a bolting face 109 formed on the lower right-hand end of the filling piece 8.

The above-mentioned casing section 105 of the graduated release valve device 63 which constitutes a part of the present invention is provided with a bore 110 that opens at its upper end into a chamber 111 formed in the casing section 105. This bore 110 has at its upper end an annular valve seat 112. Opening into the chamber 111 is the other end of the hereinbefore-mentioned passageway 66 which extends through the filling piece 8, and casing sections 107 and 105.

Disposed in the chamber 111 is a flat disc-type valve 113 between the upper side of which and a screw-threaded plug 114 that has screw-threaded engagement with corresponding internal screw threads formed in the casing section 105 is interposed a spring 115 that is effective to bias the valve 113 toward the valve seat 112 and into contact with the upper end of a stem 116 that extends with with a sliding fit through the bore 110 into which opens intermediate its ends one end of a passageway 117 formed in the casing section 105. The opposite end of this passageway 117 opens into a chamber 118 provided in the casing section 105 which chamber 118 in turn is open to atmosphere via an exhaust choke 119 the size of which is the same as that of the hereinbefore-mentioned brake cylinder exhaust choke 67 (FIG. 2).

Intermediate its ends and above a collar 120 formed integral therewith, the stem 116 is provided with a peripheral annular groove in which is disposed an O-ring 121 that forms a seal with the wall surface of the bore 110 to prevent leakage of fluid under pressure from a chamber 122 above an abutment or diaphragm 123 to the atmospheric chamber 118 via the bore 110 and passageway 117.

The inner periphery of the diaphragm 123 is clamped between two diaphragm followers 124 and 125 which are secured together by a nut 126 that has screw-threaded engagement with a screw-threaded lower end of the stem 116 extending below the collar 120 thereon and through coaxial bores in these followers.

The outer periphery of the diaphragm 123 is clamped between the lower side of the first casing section 105 and the upper side of a second casing section 127 of the graduated release valve device 63 which casing sections are secured together by any suitable means (not shown).

The diaphragm 123 cooperates with the casing sections 105 and 127 to form respectively above this diaphragm the above-mentioned chamber 122 and below it a chamber 128. The chamber 122 is connected to the hereinbefore-mentioned passageway 39 (FIG. 2) by a passageway 129 (FIG. 3) which extends through the casing sections 105 and 107 and the filling piece 8. Since the passageway 39 is constantly connected to the emergency reservoir 4 by the correspondingly numbered pipe, it is apparent that the pressure in the chamber 122 is always the same as that in the emergency reservoir 4.

Figure 4:
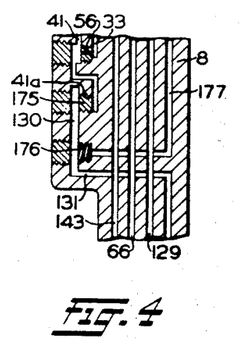
FIG. 4 is a partial diagrammatic view of a portion of the filling piece shown in FIG. 2 showing how the graduated release valve device shown in FIG. 3 may be made subject to control by variations in the pressure in the auxiliary reservoir.

As shown in FIGS. 2 and 4, the other end of the hereinbefore-mentioned passageway 41 in the filling piece 8 is open through a screw-threaded port 41a into a chamber 130 formed in this filling piece which chamber 130 is connected to the chamber 128 (FIG. 3) below the diaphragm 123 by a passageway 131 extending through the filling piece 8, and casing sections 107, 105 and 127. Since the chamber 43 (FIG. 2) is connected to the brake pipe 2 in the manner hereinbefore explained, it is apparent that the fluid under pressure supplied to the chamber 43 from the brake pipe 2 flows from this chamber 43 to the chamber 128 (FIG. 3) below the diaphragm 123 via passageways 42 and 41 (FIG. 2), port 41a, chamber 130 and passageway 131 (FIG. 3) so that the pressure in the chamber 128 varies in accordance with variations in the pressure in the brake pipe 2.

Disposed in the chamber 128 and interposed between the casing section 127 and the diaphragm follower 125 is a spring 132 which is effective, while the emergency reservoir pressure in the chamber 122 above the diaphragm 123 and the brake pipe pressure in the chamber 128 below this diaphragm are the same value, to bias the collar 120 on the stem 116 against a stop surface 133 formed on the casing section 105 and thereby maintain the stem 116 in the position shown in FIG. 3 in which position it is effective to unseat valve 113 from the seat 112. Therefore, while the service slide valve 28 occupies its release position shown in FIG. 2 and the cap member 64 is positioned for graduated release operation as shown in FIG. 2, the brake cylinder device 5 (FIG. 1) is open to atmosphere via a pipe 134 and a correspondingly numbered passageway in the pipe bracket 7 (FIG. 2), a passageway 135 in the blanking pad 9, a passageway 136 extending through the pipe bracket 7, filling piece 8, casing section 15, the reservoir releases valve device 13, and the brake cylinder release valve device 14 while in its normal position, the passageway 38, a cavity 137 formed in the left-hand face of the service slide valve 28, passageways 37, 65 and 66, chamber 111 (FIG. 3), bore 110, passageway 117, chamber 118 and exhaust choke 119.

The graduated release valve device 63 further comprises a second abutment or diaphragm 138 the outer periphery of which is claimed between the lower side of the casing section 127 and a bottom cover 139 which is secured to this casing section 127 by any suitable means (not shown).

Two chambers 140 and 141 are formed respectively at the opposite sides of the diaphragm 138. Chamber 140 is open to atmosphere via a passageway 142 formed in the casing section 127 and chamber 141 is connected to the hereinbefore-mentioned passageway 136 (FIG. 2) intermediate the ends thereof by a passageway 143 extending through the bottom cover 139, casing sections 127, 105 and 107, filling piece 8 and pipe bracket 7. Since the passageway 136 is connected to the brake cylinder device 5 (FIG. 1) via passageway 135 and passageway and corresponding pipe 134, and the brake cylinder device 5 is normally open to atmosphere in the manner hereinbefore explained, it will be understood that the chamber 141 below the diaphragm 138 is likewise normally open to atmosphere.

Disposed within the chamber 140 (FIG. 3) and in abutting relationship with the upper side of the diaphragm 138 is a diaphragm follower plate 144 that has formed integral with the upper side thereof a stem 145 that extends through a bore 146 provided in the casing section 127 and opening at its upper end into the chamber 128 and at its lower end into the chamber 140. This stem 145 extends into the chamber 128, is coaxial with the hereinbefore-mentioned stem 116, and is provided intermediate its ends with a peripheral annular groove in which is disposed an O-ring 147 that has sealing and sliding contact with the wall surface of the bore 146 to prevent leakage of fluid under pressure from the chamber 128 to the atmospheric chamber 140.

The casing 107 of the emergency reservoir charging cut-off valve device 108 is provided with a bottom bore 148 into the bottom of which opens one end of a passageway 149 extending through the casing 107 and opening at its opposite end into that portion of the hereinbefore-mentioned passageway 129 that extends through the casing 107. Slidably mounted in the bottom bore 148 is a valve stem 150 having intermediate its ends a collar 151 above which is a screw-threaded portion of reduced diameter which extends through an annular diaphragm 152 and receives a diaphragm follower plate 153 and a nut 154 having screw-threaded engagement therewith to clamp the inner periphery of the diaphragm 152 between the collar 151 and the follower plate 153 thereby operatively connecting the diaphragm to the valve stem 150.

The outer periphery of the diaphragm 152 is clamped between the upper end of the casing 107 and a cover member 155 which is secured thereto by any suitable means (not shown). The diaphragm 152 cooperates with the casing 107 and cover member 155 to form within the emergency reservoir charging cut-off valve device 108 and on opposite sides of the diaphragm, a pair of chambers 156 and 157, the former being open to atmosphere via a port 158 provided in the cover member 155 and the latter being connected by a passageway 159 extending through the casing 107 to that portion of the passageway 143 in this casing 107.

The valve stem 150 is provided with a central passageway 160 that extends from the lower end thereof to a crossbore 161 therein the opposite ends of which open at the surface of an elongated peripheral annular groove 162 formed on the valve stem 150 intermediate the ends thereof. The valve stem 150 is further provided with three spaced-apart peripheral annular grooves, one above the elongated peripheral annular groove 162 and two below, in each of which is disposed an O-ring 163 that forms a seal with the wall surface of the bottom bore 148.

Disposed in the chamber 156 in surrounding relation to the nut 154 and interposed between the cover member 155 and the follower plate 153 is a spring 164 which is effective to bias the stem 150 and collar 151 downward to the position shown in FIG. 3 in which the collar 151 abuts a stop surface 165 formed on the casing 107. In this position of the valve stem 150, one end of a passageway 166 formed in the casing 107 opens at the wall surface of the bottom bore 148 intermediate the ends of the elongated peripheral annular groove 162 on this stem 150 and the opposite end opens into that portion of the hereinbefore-mentioned passageway 131 extending through the casing 107.

OPERATION

Initial charging

To initially charge the brake equipment shown in FIG. 1, fluid under pressure is supplied to the brake pipe 2 in the usual well-known manner. Fluid under pressure thus supplied to the brake pipe 2, flows via branch pipe 53, combined cut-out cock and centrifugal dirt collector 54, passageway 55 (FIG. 2), chamber 44, strainer device 45, and choke 50 to the chamber 43. Fluid under pressure thus supplied to the chamber 43 flows therefrom to the chamber 24 above the diaphragm 16 via passageway 42, choke 60, passageway 35 and branch passageway 35a. Fluid under pressure also flows from the chamber 43 to the chamber 25 below the diaphragm 16 via passageways 42 and 41, auxiliary reservoir charging choke 56, passageway 33 extending through filling piece 8 and casing section 15 and the corresponding port in the slide valve seat 31, and the passageway 73 in the service slide valve 28.

Fluid under pressure supplied from the brake pipe 2 to the chamber 25 in the manner explained above, flows from this chamber to the auxiliary reservoir 3 (FIG. 1) via the passageway and corresponding pipe 29.

Fluid under pressure also flows from the chamber 43 (FIG. 2) to the chamber 128 (FIG. 3) in the graduated release valve device 63 via passageways 42 and 41, port 41a, chamber 130 and passageway 131.

It will be noted from FIG. 3 that fluid under pressure will flow from the passageway 131 to the chamber 122 in the graduating release valve device 63 via passageway 166, groove 162, crossbore 161, passageway 160, bottom bore 148, passageway 149 and passageway 129. Consequently, the chambers 128 and 122 are charged simultaneously from the brake pipe 2. Therefore, the spring 132 is effective to maintain the collar 120 in abutting relationship with the stop surface 133 so that the stem 116 maintains the valve 113 unseated from the seat 112, as shown in FIG. 3.

It will be noted from FIG. 3 that fluid under pressure supplied to passageway 129 and the chamber 122 will flow from the passageway 129 to the emergency reservoir 4 (FIG. 1) via passageway 39 (FIG. 2) and the correspondingly numbered pipe. From the foregoing, it is apparent that the emergency reservoir charging cut-off valve device 108 controls the charging of the chamber 122 and the emergency reservoir 4 from the brake pipe 2. Consequently, it will be understood that the chambers 122 and 128 in the graduated release valve device 63 and both the auxiliary reservoir 3 and the emergency reservoir 4 are charged with fluid up to brake pipe pressure.

While the service slide valve 28 occupies its release position as shown in FIG. 2, the brake cylinder device 5 (FIG. 1) is open to atmosphere via the pathway hereinbefore-described in detail.

It should be understood that fluid under pressure supplied from the brake pipe 2 to the branch passageway 35a (FIG. 2) flows therefrom to the chamber 81 in the accelerated service release valve mechanism 12 via the branch passageway 35b and passageways 101 and 104, and that the chamber 86 in this valve mechanism 12 is connected to the emergency reservoir 4 via branch passageway 39a, and passageway and corresponding pipe 39. Furthermore, the chamber 82 in this valve mechanism 12 is connected to the chamber 25 via a passageway 167 that extends through the casing sections 76 and 15. Consequently, fluid under pressure supplied to the chamber 25 in the manner hereinbefore described will flow to the chamber 82 via the passageway 167. Therefore, it will be understood that chambers 81 and 82 are both charged from the brake pipe to the normal pressure carried therein so that the parts of the accelerated service release valve mechanism 12 remain in the position shown in FIG. 2.

SERVICE BRAKE APPLICATION

Let it be supposed that it is desired to effect a service brake application. A service brake application is initiated by effecting a gradual reduction of pressure in the brake pipe 2 to a value corresponding to the desired degree of brake application.

As the pressure in the brake pipe 2 is reduced, the pressure in the chamber 128 (FIG. 3) in the graduated release valve device 63 is likewise reduced since this chamber 128 is connected via the passageway 131, chamber 130 (FIG. 2), port 41a and passageways 41 and 42 to the chamber 43 which is connected to the brake pipe 2 in the manner hereinbefore described.

As the pressure in the chamber 128 (FIG. 3) below the diaphragm 123 is thus reduced simultaneously as the pressure in the brake pipe 2 is reduced, emergency reservoir pressure which is present in the chamber 122 above the diaphragm 123 is rendered effective to deflect this diaphragm 123 downward to move the stem 116 downward therewith. As the stem 116 is thus moved downward, the spring 115 moves the valve 113 downward until it seats on valve seat 112 to thereby close communication between the brake cylinder device 5 and atmosphere.

Since, as hereinbefore described, the brake pipe 2 is in communication with the chamber 24 (FIG. 2) in the service portion 11, the pressure of fluid in this chamber gradually reduces with the brake pipe pressure at a controlled service rate. It being understood that the size of the choke 60 is greater than that of the auxiliary reservoir charging choke 56, upon a predetermined, but light reduction in the pressure in the chamber 24 below that in the chamber 25, the pressure of fluid in the chamber 25 causes the diaphragm 16 to be deflected upward, and through the medium of the stem 18, shifts graduating valve 26 relative to the service slide valve 28 to quick service position. It will also be understood that this movement of the graduating valve 26 relative to the service slide valve 28 is obtained by means of the usual structure provided for this purpose.

In initial quick service position of the graduating valve 26, a cavity 168 in this graduating valve connects the passageways 71 and 74 in the service slide valve 28. At the service slide valve seat 31, the passageway 71, as before described, is connected to the passageway 35, which is at all times open to the brake pipe 2 through choke 60, passageway 42, chamber 43. choke 50, strainer device 45, chamber 44, passageway 55, combined cut-out cock and centrifugal dirt collector 54, and branch pipe 53. The passageway 74 is connected to the port and corresponding passageway 34 leading to the quick service volume chamber 57 in the casing section 15 which chamber 57 is open to atmosphere via the choke 58 and insect excluder device 59. With the passageways 35 and 34 thus connected to each other, fluid under pressure is permitted to flow from the brake pipe 2 to the quick service volume chamber 57 and from thence it flows to atmosphere via the choke 58 and insect excluder device 59.

The initial local quick service flow of fluid under pressure from the brake pipe 2 to the quick service volume chamber 57 is at a fast rate until the brake pipe pressure substantially equalizes into the volume chamber 57 and then continues at a slower rate governed by the size of the choke 58. The initial flow of fluid under pressure to the volume chamber 57 produces a sudden limited quick service reduction in pressure in the brake pipe 2 for initially hastening the operation of the brake control valve device 1 on the next car in the train. The valve device 1 on the next car then operates in a similar manner and in this way a quick serial response to the brake pipe reduction is transmitted from one car to the next throughout the length of the train.

After this sudden limited reduction in brake pipe pressure has been effected by the flow of fluid to the quick service volume chamber 57, the quick service reduction continues at a slower rate via the choke 58 and insect excluder device 59. This continued reduction is for the purpose of increasing the differential of pressure acting on the opposite sides of the diaphragm 16 to thereby cause further upward deflection of the diaphragm 16 and shifting of the graduating valve 26 and the service slide valve 28 in the same direction to their service position.

As the service slide valve 28 is shifted upward by the diaphragm 16 from its normal release position shown in FIG. 2, the passageway 74 is moved out of alignment with the port and corresponding passageway 34, and the passageway 71 is moved out of alignment with the port and corresponding passageway 35 so that these ports in the slide valve seat 31 are lapped by the service slide valve 28 thereby closing off quick service flow of fluid from the brake pipe 2 to atmosphere by way of the quick service volume 57 and choke 58.

At substantially the same time as the port and corresponding passageway 35 is lapped by the slide valve 28 as it is moved upward in the manner explained above, the port opening from the passageway 75 at the left-hand face of the slide valve 28 is cracked open to the port and corresponding passageway 38 in the slide valve seat 31, it being understood that the port opening from the passageway 75 at the right-hand face of the service slide valve 28 has been previously uncovered by the prior movement of the graduating valve 26 relative to the service slide valve 28. Therefore, fluid under pressure will now start to flow from the chamber 25 and the auxiliary reservoir 3 connected thereto by the pipe and corresponding passageway 29 to the brake cylinder device 25 (FIG. 1) via the passageway 75 (FIG. 2) in the service slide valve 28, port 38 in slide valve seat 31 and the corresponding passageway 38 extending through the casing section 15, the reservoir release valve device 13 and the brake cylinder release valve device 14, passageway 136, passageway 135 and passageway and corresponding pipe 134, it being understood that the passageway 38 and the passageway 136 are connected through the brake cylinder release valve device 14 in a manner explained in the hereinbeforementioned Patent 3,232,678.

Some of the fluid under pressure supplied from the auxiliary reservoir 3 to the passageway 136 (FIG. 2) in the manner just explained will flow therefrom to the chamber 157 (FIG. 3) below the diaphragm 152 of the emergency reservoir charging cut-off valve device 108 via the passageways 143 and 159 so that the pressure in the chamber 157 increases simultaneously as the pressure in the brake cylinder device 5 (FIG. 1) increases.

As fluid under pressure is supplied to the chamber 157 in the manner just described, it is effective to deflect the diaphragm 152 upward against the yielding resistance of the spring 164 and thereby move the valve stem 150 operatively connected thereto upward to a position in which the two O-rings 163 carried thereon below the groove 162 are so disposed that the upper O-ring 163 forms a seal with the wall surface of the bottom bore 148 above the location at which the passageway 166 opens at the wall surface of this bottom bore, and the lower O-ring 163 forms a seal with this wall surface below the location at which the passageway 166 opens at this wall surface. Therefore, in this position of the stem 150, communication between passageways 166 and 149 is closed thereby cutting off charging of the emergency reservoir 4 (FIG. 1) and chamber 122 (FIG. 3) from the brake pipe 2 and trapping the pressure in this reservoir 4 and chamber 122 so that this pressure is not reduced simultaneously as brake pipe pressure is reduced.

Also, some of the fluid under pressure supplied from the auxiliary reservoir 3 to the passageway 136 (FIG. 2) in the manner explained above will flow therefrom to the chamber 141 (FIG. 3) below the diaphragm 138 of the graduated release valve device 63 via the passageway 143. Consequently, the pressure in the chamber 141 will increase simultaneously as the pressure in the brake cylinder device 5 (FIG. 1) increases.

Fluid under pressure supplied to the chamber 141 is effective to deflect the diaphragm 138 upward and thereby move the diaphragm follower plate 144 and stem 145 integral therewith upward until the upper end of the stem 145 abuts the lower end of the stem 116.

It is well known by those skilled in the art that brake cylinder pressure increases correspondingly as the pressure in the brake pipe is reduced. Therefore, the pressure built up in the brake cylinder device 5 (FIG. 1) and the chamber 141 (FIG. 3) corresponds to the degree of reduction of pressure effected in the brake pipe 2 and the chamber 128 below the diaphragm 123. It will be noted, however, that the effective area of the diaphragm 138 is substantially less than the effective area of the diaphragm 123. Consequently, the sum of the forces of the reduced brake pipe pressure present in the chamber 128 and acting over the effective area of the lower side of the diaphragm 123, and the brake cylinder pressure present in the chamber 141 and acting over the effective area of the lower side of the diaphragm 138 is less than the force resulting from the substantially fully charged emergency reservoir pressure present in the chamber 122 and acting over the effective area of the upper side of the diaphragm 123. Therefore, spring 115 remains effective to maintain valve 113 seated on seat 112 to prevent flow of fluid under pressure from the brake cylinder device 5 (FIG. 1) and chambers 157 and 141 (FIG. 3) to atmosphere.

In the service position of the service slide valve 28 (FIG. 2), a cavity 169 formed in the left-hand face of the service slide valve establishes a communication between the port and corresponding passageway 35 and the port and corresponding passageway 36 in the casing section 15. Consequently, when the cavity 169 in the service slide valve 28 is moved into registry with the ports 35 and 36 in the slide valve seat 31, fluid under pressure flows from the brake pipe 2 (FIG. 1) to the brake cylinder device 5 via the quick service valve device 61 (FIG. 2) as explained in the above-mentioned Patent 3,232,678 until the pressure in the brake cylinder device builds up to ten pounds per square inch whereupon the valve device 61 operates to cut off further flow of fluid under pressure therethrough from the brake pipe 2 to the brake cylinder device 5 and thus terminates further quick service operation.

SERVICE LAP

In order to limit the degree of a brake application to that desired, the brake pipe pressure is reduced an amount sufficient to effect a corresponding degree of brake application. Then, when the auxiliary reservoir pressure in the chamber 25 (FIG. 2) is reduced, by flow through the ports and corresponding passageway 75 in the service slide valve 28 and the port and corresponding passageway 38, reservoir release valve device 13, brake cylinder release valve device 14, passageways 136 and 135, and passageway and corresponding pipe 134 to the brake cylinder device 5, an amount substantially equal to or slightly below the degree of brake pipe reduction effected in the chamber 24, the diaphragm 16, valve stem 18 and graduating valve 26 are deflected and moved respectively in a downward direction from their service position to their service lap position in which they are brought to a stop by a shoulder 170 on guide member 30 moving into contact with the upper end of the slide valve 28 which remains in its service position.

In this service lap position of the graduating valve 26, the lower end of the cavity 168 in this graduating valve is in alignment with the port at the right-hand end of the passageway 75 in the service slide valve 28 and the upper end of the cavity 168 is closed by the right-hand face of the service slide valve 28. Thus, further flow of fluid under pressure from the auxiliary reservoir 3 to the chambers 157 and 141 (FIG. 3) and the brake cylinder device 5 (FIG. 1) is cut off.

Also, in this service lap position of the graduating valve 26, a passageway 171 in the graduating valve 26 registers with a passageway 172 in the service slide valve 28 which is now in its service position. In this service position of the service slide valve 28 the passageway 172 registers with the port 33 in the service slide valve seat 31. Since the passageway 33 is connected by the choke 56, passageway 41 and passageway 42 to the chamber 43 which is connected to the brake pipe 2 in the manner hereinbefore described, fluid under pressure can now flow from the brake pipe 2 to the chamber 25 and thence to the auxiliary reservoir 3 via passageway and corresponding pipe 29. Consequently, the pressure in the chamber 25 and the auxiliary reservoir 3 is maintained constant notwithstanding any leakage of fluid under pressure from the auxiliary reservoir 3. By thus maintaining the fluid pressure in chamber 25 constant while the service slide valve 28 and the graduating valve 26 occupy their service lap position, an undesired release of the brake application in effect is prevented.

RELEASE OF A SERVICE BRAKE APPLICATION (A) *Accelerated direct release of a service brake application*

Let it be supposed that: (1) each car in a train is provided with the brake control valve device 1; (2) the cap members 64 and 101 on the control valve on each car are positioned as shown in FIG. 2 to respectively cut into operation the graduated release valve device 63 (FIG. 3) and the accelerated service release valve mechanism 12 (FIG. 2), and (3) the locomotive hauling the train is provided with an engineer's brake valve device having a manually movable handle which, while it occupies its running (i.e., release) position, provides for a fast or normal rate of charging a train brake pipe, and which, while being moved toward its running position from any position in its application zone and prior to reaching its running position, provides a less than normal or a restricted rate of brake pipe charging.

To effect an accelerated direct release of the brakes on the entire train following a service brake application thereon, the engineer will move the handle (not shown) of the engineer's brake valve device on the locomotive directly and quickly from whatever position it occupies in its application zone in the direction of its running position back to this position. Upon return of the handle to this running position, the brake valve device is rendered effective to supply fluid under pressure from the usual main reservoir located on the locomotive to the train brake pipe at the above-mentioned fast or normal rate.

Fluid under pressure thus supplied to the train brake pipe and therefore to the brake pipe 2 (FIG. 1) on each car in the train will flow therefrom to: (1) the chamber 24 (FIG. 2) in the service valve device 11 via the pathway hereinbefore-described in detail in connection with initial charging; (2) the chamber 81 in the accelerated service release valve mechanism 12 in the manner hereinbefore explained in detail; and (3) the chamber 128 (FIG. 3) in the graduated release valve device 63 via the same channel as in initial charging.

Upon the supply of fluid under pressure from the brake pipe 2 to the chamber 24 (FIG. 2) above the diaphragm 16 increasing the pressure in this chamber to a chosen value, for example, one pound per square inch, in excess of the retained auxiliary reservoir pressure present in the chamber 25 below this diaphragm, a sufficient differential of pressure on the diaphragm 16 is established to deflect it in a downward direction to, through the intermediary of the stem 18, shift the graduating valve 26 and the service slide valve 28 from their service lap position downward to their release position in which they are shown in FIG. 2. In this release position of the service slide valve 28, the brake cylinder device 5 (FIG. 1) is connected to the chamber 111 (FIG. 3) in the graduated release valve device 63 via pipe and passageway 134, passageways 135, 136 and 38 (FIG. 2), cavity 137 in service slide valve 28, passageways 37, 65 and 66, it being remembered that valve 113 is now seated on valve seat 112 to prevent flow of fluid under pressure from the chamber 113 to atmosphere.

Subsequent to the return of the graduating valve 26 and the service slide valve 28 to their release position in which they are shown in FIG. 2, fluid under pressure will flow from the brake pipe 2 to the chamber 25, the auxiliary reservoir 3, and the chamber 82 in the accelerated service release valve mechanism 12 via the pathway hereinbefore described in connection with initial charging it being remembered that the auxiliary reservoir charging choke 56 is disposed in this pathway. It will be noted, therefore, that fluid under pressure is now being supplied from the brake pipe 2 to the chamber 81 in the accelerated service release valve mechanism 12 at an unrestricted rate, and to the chamber 82 in this valve mechanism at a restricted rate dependent upon the size of the choke 56. Consequently, a differential of pressure is established on the diaphragm 79 of the accelerated service release mechanism 12 which acts in the direction of the left-hand, as viewed in FIG. 2. When this differential of pressure increases to a chosen value, for example, one and six-tenths pounds per square inch, it is effective to deflect the diaphragm 79 in the direction of the left-hand, as viewed in FIG. 2, and thereby shift the valve operating stem 78 in the same direction relative to the wall of the bore 83. This leftward movement of the stem 78 in response to the increasing differential of pressure on the opposite sides of the diaphragm 79 causes the left-hand end of the stem 78 to unseat the valve 77 from its seat 87 against the yielding resistance of spring 90.

With valve 77 unseated, a fluid pressure communication is established by which fluid under pressure is supplied from the emergency reservoir 4 to the brake pipe 2, this communication extending from the reservoir 4 via the pipe and corresponding passageway 39, branch passageway 39a, chamber 86 and past the unseated valve 77 to bore 85 and thence through the chamber 84, and passageway 95 to the inner seated area of valve 98. When the pressure of fluid acting on the upper side of valve 98 and within the seated area of this valve increases sufficiently to overcome the biasing force of the spring 100 acting on the lower side thereof, the valve 98 will be unseated from its seat 96. With valve 98 unseated, a communication is established through which fluid under pressure supplied to the passageway 95 from the emergency reservoir 4, as described above, is conveyed to the chamber 97 and thence to the brake pipe 2 via branch passageways 35c, 35b and 35a, passageway 35, choke 60, passageway 42, chamber 43, choke 50, strainer device 45, chamber 44, passageway 55, combined cut-out cock and dirt collector 54 and branch pipe 53. Fluid under pressure will now flow from the fully charged emergency reservoir 4 to the brake pipe 2 until equalization of pressure therebetween occurs thus hastening the buildup of pressure in the brake pipe 2 as all of the fluid under pressure supplied to the brake pipe for effecting a brake release does not have to be conveyed from the locomotive back through the train brake pipe extending from car to car through the train.

Since the chamber 122 (FIG. 3) above the diaphragm 123 of the graduated release valve 63 is connected to the emergency reservoir 4 and the chamber 128 below this diaphragm is connected to the brake pipe 2 in the manner hereinbefore explained, it will be apparent that equalization of pressure between the emergency reservoir 4 and the brake pipe 2 resulting from operation of the accelerated service release valve mechanism 12 in the manner explained above, provides for equalization of the pressures in the chambers 122 and 128 on opposite sides of the diaphragm 123.

Upon the occurrence of equalization of pressure in the chambers 122 and 128 on the opposite sides of the diaphragm 123 thereby balancing the fluid pressure forces acting thereon, the fluid at the same pressure as that in the brake cylinder device 5 present in the chamber 141 below the diaphragm 138 of the graduated release valve device 63 will deflect this diaphragm 138 upward and in conjunction with spring 132 move the stems 145 and 116 upward to unseat the valve 113 against the yielding resistance of the spring 115 from the valve seat 112.

Since the brake cylinder device 5 is now connected to the chamber 111, as hereinbefore explained, fluid under pressure from the brake cylinder device 5 and chamber 111 will now flow to atmosphere past the unseated valve 113 and through the bore 110, passageway 117, chamber 118 and exhaust choke 119.

It will be noted that the chamber 141 below the diaphragm 138 is connected to the chamber 111 via passageways 143, 136 and 38, cavity 137, and passageways 37, 65 and 66. Therefore, fluid under pressure will be released from the chamber 141 to atmosphere simultaneously as fluid under pressure is released from the brake cylinder device 5 to atmosphere until a complete direct brake release is obtained on each car in the train, it being noted that the spring 132 will maintain the valve 113 unseated from the valve seat 112 thereby providing for the reduction of the pressure in the brake cylinder device 5 and chamber 141 to atmosphere pressure.

(B) *Graduated release of a service brake application to any degree*

Assume that a service brake application on all the cars in a train has been previously effected in the manner hereinbefore explained under Service Brake Application.

To effect the first step in a graduated release of the brakes to any desired degree and in any number of desired steps on all the cars in the train subsequent to either a partial or a full service brake application, the engineer will move the handle of the brake valve device from whatever position it occupies in its service zone in the direction of its running position to a seected position in the service zone corresponding to the higher degree of pressure desired in the train brake pipe and therefore to the reduction in pressure to be effected in the brake cylinder device 5 on all the cars in the train.

As the handle of the brake valve device is thus moved from whatever position it occupies in its service zone in the direction of its running position to the selected position in its service zone, a self-lapping control valve device which constitutes a part of the brake valve device is operated to effect the supply of fluid under pressure from the main reservoir to a relay valve device which also constitutes part of the brake valve device. Fluid under pressure thus supplied to the relay valve device operates this device, in a manner described in Patent 2,958,561 issued Nov. 1, 1960 to Harry C. May, and assigned to the assignee of the present application, to effect the supply of fluid under pressure from the main reservoir to the train brake pipe at a restricted rate which is less than the hereinbefore-mentioned normal rate. This supply of fluid under pressure to the train pipe at this restricted rate will flow to the brake pipe 2 (FIG. 1) on each car in the train and thence via the pathway hereinbefore described in detail in connection with initial charging to: (1) the chamber 24 (FIG. 2) in the service valve device 11; (2) the chamber 81 in the accelerated service release valve mechanism 12; and (3) the chamber 128 (FIG. 3) in the graduated release valve device 63. Consequently, fluid under pressure will build up in the chamber 24 as the engineer on the locomotive moves the handle of the brake valve device to the selected position in the service zone. Upon the handle reaching the selected position, the relay valve device of the brake valve device operates to cut off flow of fluid under pressure to the train brake pipe and thence to the brake pipe 2 and chamber 24 on each respective car in the train.

Upon the pressure in the chamber 24 increasing to the chosen value of, for example, one pound per square inch in excess of the retained auxiliary reservoir pressure present in the chamber 25, as hereinbefore explained, the diaphragm 16 is deflected downward to shift the graduating valve 26 and the service slide valve 28 from their service lap position downward to their release position in which they are shown in FIG. 2 in which position the brake cylinder device 5 (FIG. 1) is connected to the chamber 111 (FIG. 3) via the pathway hereinbefore described, it being remembered that valve 113 was seated on valve seat 112 when the brake application was effected.

Subsequent to the return of the graduating valve 26 and the service slide valve 28 to their release position, fluid under pressure will flow from the brake pipe 2 to the chambers 81 and 82 in the accelerated service release valve mechanism 12 via the pathways hereinbefore described. The size of the choke 56 which is disposed in the pathway to the chamber 82, is of such a size that, since the flow of fluid under pressure to the brake pipe 2 by the engineer's brake valve device is now at a restricted rate, the required differential of pressure to effect operation of the accelerated service release valve mechanism 12 will not be established on the diaphragm 79 of this valve device. Consequently, the accelerated service release valve mechanism 12 does not operate at this time to effect an equalization of pressure between the emergency reservoir 4 and the brake pipe 2.

It will be remembered that when a brake application was effected, fluid under pressure that was supplied to the brake cylinder device 5 (FIG. 1) was also supplied to the chamber 141 (FIG. 3) so that the diaphragm 138 was deflected upward to move the stem 145 upward until its upper end was moved into contact with the lower end of the stem 116. Therefore, upon the supply of fluid under pressure from the brake pipe 2 to the chamber 128, a differential of pressure is established on the diaphragm stack including diaphragms 123 and 141. The fluid pressure force thus established on this diaphragm stack is effective to move the stems 145 and 116 upward to effect unseating of valve 113 from its seat 112.

When valve 113 is thus unseated from its seat 112, fluid under pressure is released from the brake cylinder device 5 (FIG. 1) and the chambers 141 and 157 (FIG. 3) to atmosphere via pathways hereinbefore described. It will be noted that this release of fluid under pressure from the chamber 141 to atmosphere reduces the differential fluid pressure force on the diaphragm stack including the diaphragms 138 and 123. Consequently, when the pressure in the chamber 141 and the brake cylinder device 5 is reduced an amount corresponding to the amount of increase in the pressure effected in the chamber 128 and the brake pipe 2 as the result of the engineer moving the handle of the brake valve device on the locomotive from the position it occupied in its service zone in the direction of its running position to the position selected in its service zone corresponding to the higher degree of pressure desired in the train brake pipe and therefore to the reduction in pressure effected in the brake cylinder device 5 (FIG. 1) and in the chambers 141 and 157 on all cars in the train, each spring 115 is rendered effective to reseat the corresponding valve 113 on its seat 112 to cut off flow of fluid under pressure from the brake cylinder device 5 and chambers 141 and 157 to atmosphere. It is, therefore, apparent that as the pressure in the chambers 24 (FIG. 2) and 128 (FIG. 3) of the respective service valve device 11 and graduated release valve device 63 of the brake control valve device 1 on each car in the train increases in response to the pressure supplied thereto from the brake valve device on the locomotive via the train brake pipe, each service valve device 11 will be returned to its release position and thereafter, each corresponding graduated release valve device 63 will operate to reduce the pressure in the corresponding brake cylinder device 5 (FIG. 1) and chambers 141 and 157 (FIG. 3) to a degree proportional to the increase in the pressure effected in the train brake pipe by the engineer.

To effect the second step, and each succeeding step of a graduated release of the brakes, the engineer will move the handle of the brake valve device from the first selected position it occupies in its service zone in the direction of its running position to another selected position in the service zone corresponding to the higher degree of pressure desired in the train brake pipe and, therefore, the reduced pressure to be obtained in the chambers 157 and 141 (FIG. 3) and in the brake cylinder device 5 (FIG. 1) on all the cars in the train.

As the handle of the brake valve device is thus moved in the direction of its running position to another selected position in its service zone, the pressure in the train brake pipe will be increased in accordance with the amount of arcuate movement of the handle toward its running position whereupon the graduated release valve device 63 of the brake control valve device 1 on all the cars in the train operates in the manner explained above to reduce the pressure in the corresponding brake cylinder device 5 (FIG. 1) and the chambers 157 and 141 (FIG. 3) to a degree proportional to the increase in the pressure effected in the train brake pipe.

In view of the above, it will be apparent that the engineer may, by moving the handle of the brake valve device in steps toward its running position, effect in successive steps a reduction of the pressure in the chambers 157 and 141 and the brake cylinder device 5 on all cars in the train until this pressure is reduced to atmospheric pressure.

OPTIONAL ADAPTATION OF THE BRAKE CONTROL VALVE DEVICE FOR GRADUATED RELEASE OPERATION ONLY

Let it be supposed that it is desired to convert the brake control valve device 1 (FIG. 2) from a combined accelerated direct release and graduated release type of brake control valve device to a graduated release type of brake control valve device only.

Figure 6:
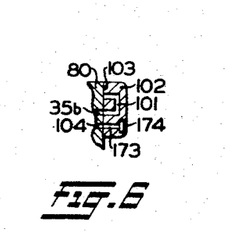
FIG. 6 is a partial cross-sectional view showing a fragment of an accelerated service release valve mechanism and a second cap member shown in FIG. 2, with this cap member in a different position than that shown in FIG. 2 so as to cut-out and render inoperative the accelerated service release valve mechanism.

First, the cap member 102 is removed from the face 103 formed on the clamping cover 80. Next, this cap member 102 is secured to the face 103 in the position in which it is shown in FIG. 6 of the drawings. As shown in FIG. 6, the passageway 101 in the cap member 102 no longer establishes a communication between the branch passageway 35b and the passageway 104. In this position of this cap member 102 one end of the passageway 101 registers with that end of the passageway 35b that opens at the face 103 and the other end of this passageway is closed by the face 103. Therefore, fluid under pressure cannot escape from the brake pipe 2 and the passageway 35b to atmosphere, and no fluid under pressure can be supplied from the brake pipe 2 to the chamber 81 in the accelerated service release valve mechanism 12. Also, while the cap member 102 occupies the position in which it is shown in FIG. 6, a passageway 173 formed in the cap member 102 and having therein at one end thereof an insect excluder 174 registers at its opposite end with the passageway 104 in the cover 80. Therefore, the chamber 81 at this time is open to atmosphere via passageways 104 and 173 and insect excluder 174. Consequently, the accelerated service release valve mechanism is now inoperative in response to either the hereinbefore-mentioned fast or restricted rate of brake pipe charging.

It will be understood, however, that upon effecting an increase in the pressure in the train brake pipe, subsequent to a service brake application, at either a fast or a restricted rate, the service valve device 11 and the graduated release valve device 63 of the brake control valve device 1 on each car in a train will operate in the manner hereinbefore described in detail to effect a graduated release of the brake application in effect on each respective car in the train.

OPTIONAL ADAPTATION OF THE BRAKE CONTROL VALVE DEVICE FOR DIRECT RELEASE OPERATION ONLY

Let it now be supposed that it is desired to convert the brake control valve device 1 shown in FIG. 2 of the drawings from a combined accelerated direct release and graduated release type of brake control valve device to a direct release type of brake control valve device only.

Figure 5:
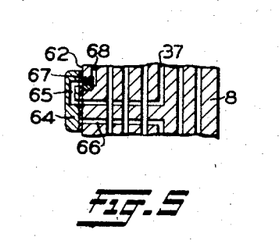
FIG. 5 is a partial cross-sectional view showing a fragment of the filling piece and a cap member shown in FIG. 2 with the cap member in a different position than that shown in FIG. 2 so as to cut-out and render inoperative the graduated release valve device.

First, the cap member 64 (FIG. 2) is removed from the face 62 formed on the left-hand side of the filling piece 8. Next, this cap member 64 is secured to the face 62 in the position in which it is shown in FIG. 5 of the drawings. As shown in FIG. 5, the passageway 65 in the cap member 64 no longer establishes a communication between the passageway 37 and the passageway 66 which is connected to the chamber 111 (FIG. 3) in the graduated release valve device 63. Consequently, this graduated release valve device 63 is now ineffective to control the graduated release of fluid under pressure from the brake cylinder device 5 to atmosphere.

On the other hand, as shown in FIG. 6, the passageway 65 in the cap member 64 now establishes a communication between the passageway 37 and the passageway 68 having therein the choke 67 which passageway 68 extends through the filling piece 8 (FIG. 2) and pipe bracket 7 and is connected by the pipe 70 to the retaining valve device 6 (FIG. 1), the handle of which it may be assumed is in its non-pressure retaining position.

Let it be assumed that the cap member 102 remains in the position in which it is shown in FIG. 2 of the drawings.

If now the handle of the brake valve device on the locomotive be moved from whatever position it occupies in its service zone in the direction of its running position to either a selected position in the service zone or to its running position to respectively effect the supply of fluid under pressure to the train brake pipe at either the hereinbefore-mentioned restricted rate or fast rate, fluid under pressure will flow from the brake pipe 1 on each car to the chamber 24 in the service valve device 11 of the brake control valve device 1 on the respective car.

Upon the supply of fluid under pressure from the brake pipe 1 to the chamber 24 in the brake control valve device 1 on each respective car increasing the pressure in this chamber to the hereinbefore-mentioned value of one pound per square inch in excess of the retained auxiliary pressure in the chamber 25, the diaphragm 16 will be deflected downward to return the graduating valve 26 and service slide valve 28 to their release position shown in FIG. 2.

In this release position of the service slide valve 28, the brake cylinder device 5 (FIG. 1) is open to atmosphere via pipe and corresponding passageway 134, passageways 135 (FIG. 2), 136 and 38, cavity 137, passageways 37, 65 (FIG. 5) and 68 (FIG. 2) having therein choke 67, pipe 70 and retaining valve device 6 (FIG. 1). Therefore, fluid under pressure will thus be completely released from the brake cylinder device 5 on each car in the train thereby effecting a complete direct brake release of the service brake application previously effected on all cars in the train.

It will be understood that, since the cap member 102 has been assumed to be secured to the face 103 of the clamping cover 80 in the position shown in FIG. 2, if the handle of the brake valve device is returned to its running position to provide for the supply of fluid under pressure to the train brake pipe at the hereinbefore-mentioned fast rate, the accelerated service release valve mechanism 12 of the brake control valve device 1 on each car in the train will operate in the manner hereinbefore-described in detail to effect equalization of pressures between the emergency reservoir 4 on the corresponding car and the brake pipe 2 to thereby hasten the recharging of the train brake pipe.

OPTIONAL ADAPTATION OF GRADUATED RELEASE VALVE DEVICE FOR CONTROL BY VARIATION OF AUXILIARY RESERVOIR PRESSURE

Let it be supposed that it is desired to control the operation of the graduated release valve device 63 (FIG. 3) in response to variation of the pressure in the auxiliary reservoir 3 (FIG. 1) rather than in response to variation of the pressure in the brake pipe 2 (FIG. 1).

To subject the lower side of the diaphragm 123 (FIG. 3) of the graduated release valve device 63 to variation of the pressure in the auxiliary reservoir 3 rather than to variation of the pressure in the brake pipe 2, a screw-threaded plug 175 (FIG. 2) is first removed from a screw-threaded port 176 formed at one end of a passageway 177 extending through the filling piece 8 and opening at its opposite end into the passageway 29 which is connected by the correspondingly numbered pipe to the auxiliary reservoir 3 (FIG. 1).

Next, this plug 175 is screw-threaded into the screw-threaded port 41a to close, as shown in FIG. 4 of the drawings, communication between the passageway 41 and the chamber 130 which is connected to the chamber 128 (FIG. 3) below the diaphragm 123 of the graduated release valve device 63 via passageway 131. With the plug 175 thus closing communication between the passageway 41 and the chamber 130, fluid under pressure cannot flow from the brake pipe 2 to the chamber 128. Therefore, the graduated release valve device 63 is no longer operative in response to variation of pressure in the brake pipe 2 which is connected to the passageway 41 via a pathway hereinbefore described.

While the plug 175 is removed from the screw-threaded port 176, as shown in FIG. 4, a communication is established between the passageway 177 and the chamber 130. Therefore, fluid under pressure flows from the auxiliary reservoir 3 (FIG. 1) to the chamber 128 (FIG. 3) below the diaphragm 123 of the graduated release valve device 63 via pipe and corresponding passageway 29, passageway 177 (FIGS. 2 and 4), port 176, chamber 130 and passageway 131.

With the lower side of the diaphragm 123 subject to the pressure in the auxiliary reservoir 3, the graduated release valve device 63 will now operate in response to variations in the pressure in the auxiliary reservoir 3 in the same manner as hereinbefore-described in detail in connection with variation of pressure in the brake pipe 2 which was heretofore connected to the chamber 128 below the diaphragm 123 prior to transfer of the screw-threaded plug 175 from the screw-threaded port 176 to the screw-threaded port 41a.

In effecting brake applications, the auxiliary reservoir pressure is reduced by flow of fluid under pressure from the auxiliary reservoir to the brake cylinder device substantially the same amount as the pressure in the brake pipe is reduced. Therefore, the graduated release valve device 63 will now operate when effecting a brake application in the same manner as hereinbefore described.

Likewise, when effecting each step of a graduated brake release subsequent to a brake application, the pressure in the auxiliary reservoir is increased in steps substantially the same amount as the pressure in the brake pipe is increased. Consequently, the graduated release valve device 63 will operate in response to the increase in steps of the pressure in the auxiliary reservoir 3 to correspondingly effect in the same number of steps a graduated brake release.

Having now described the invention what I claim as new and desire to secure by Letters Patent is:

1. Fluid pressure brake apparatus of the type having a normally charged brake pipe the reduction of fluid pressure in which initiates a brake application, an auxiliary reservoir and an emergency reservoir each normally charged with fluid at the pressure carried in the brake pipe, a brake cylinder device, and a service valve device for controlling the supply of fluid under pressure from the auxiliary reservoir to the brake cylinder device and the release of fluid under pressure from said brake cylinder device to an exhaust communication, the improvement comprising the combination therewith of a graduated release valve device of the self-lapping type interposed in said exhaust communication and operative to control release of fluid under pressure from the brake cylinder device to atmosphere via said communication, said graduated release valve device having:
  (a) a valve operative to open and close said communication to atmosphere, and
  (b) movable abutment means for actuating said valve subject in opposing relation to the pressure in the emergency reservoir and the sum of the pressure in the brake pipe and in the brake cylinder device in corresponding chambers,
  (c) said valve being actuated to its closed position in response to a reduction in pressure in the brake pipe incidental to effecting a brake application, and actuated to its open position in response to a subsequent increase in the pressure in the brake pipe to cause a reduction of pressure in the brake cylinder device corresponding to said increase in the pressure in the brake pipe.

2. Fluid pressure brake apparatus of the type having a normally charged brake pipe the reduction of fluid pressure in which initiates a brake application, an auxiliary reservoir and an emergency reservoir each normally charged with fluid at the pressure carried in the brake pipe, a brake cylinder device, and a service valve device for controlling the supply of fluid under pressure from the auxiliary reservoir to the brake cylinder device and the release of fluid under pressure from said brake cylinder device to an exhaust communication, the improvement comprising the combination therewith of:

(a) a graduated release valve device of the self-lapping type interposed in said exhaust communication and operative to control release of fluid under pressure from the brake cylinder device to atmosphere via said communication, said graduated release valve device having:
  (i) a valve operative to open and close said communication to atmosphere, and
  (ii) movable abutment means for actuating said valve subject in opposing relation to the pressure in the emergency reservoir and the sum of the pressures in the brake pipe and in the brake cylinder device in corresponding chambers,
  (iii) said valve being actuated to its closed position in response to a reduction in the pressure in the brake pipe incidental to effecting a brake application, and actuated to its open position in response to a subsequent increase in the pressure in the brake pipe to cause a reduction of pressure in the brake cylinder device corresponding to said increase in the pressure in the brake pipe, and (b) a charging control valve device to effect charging flow from the brake pipe to the emergency reservoir and to the corresponding chamber of said graduated release valve device so long as brake cylinder pressure is less than a chosen value.

3. Fluid pressure brake apparatus, as claimed in claim 2, in which said charging control valve device comprises:
(a) a valve controlling flow from the brake pipe to the emergency reservoir and the corresponding chamber of said graduated release valve device,
(b) a movable abutment operatively connected to said valve and subject to the pressure in the brake cylinder device to, upon the pressure in the brake cylinder device reaching a chosen value, move said valve from a first position in which a communication is established between the brake pipe and the emergency reservoir and the corresponding chamber of said graduated release valve device, to a second position in which said communication is closed and the pressure in the emergency reservoir and said corresponding chamber is maintained constant while a brake application is in effect.

4. A fluid pressure brake apparatus, as claimed in claim 3, in which a biasing means is effective respectively to normally bias said valve to its first position and to return said valve from its second position to its first position upon a reduction of the pressure in the brake cylinder device below said chosen value.

5. Fluid pressure brake apparatus, as claimed in claim 1, further characterized in that said movable abutment means comprises:
(a) a first movable abutment subject on its opposite sides respectively to emergency reservoir pressure and to brake pipe pressure, and
(b) a second movable abutment having a lesser effective area than and arranged in tandem relation to said first movable abutment,
(c) said second movable abutment being subject on its opposite sides respectively to atmospheric pressure and to brake cylinder pressure,
(d) said movable abutments being operative jointly to effect opening of said valve in response to an increase in the pressure in the brake pipe subsequent to a brake application to cause release of fluid under pressure from the brake cylinder device to atmosphere via said communication, and closing of said valve when the brake cylinder pressure is decreased correspondingly to the amount of increase in the pressure in the brake pipe.

6. Fluid pressure brake apparatus, as claimed in claim 2, further characterized by means operative in response to a rapid rate of increase in pressure in the brake pipe to cause an equalization of pressure between the emergency reservoir and the brake pipe to thereby render said movable abutment means operative by the pressure in the brake cylinder device to open said valve to cause a complete direct release of fluid under pressure from the brake cylinder device to atmosphere.

7. Fluid pressure brake apparatus of the type having a normally charged brake pipe the reduction of fluid pressure in which initiates a brake application, an auxiliary reservoir and an emergency reservoir each normally charged with fluid at the pressure carried in the brake pipe, a brake cylinder device, a service valve device for controlling the supply of fluid under pressure from the auxiliary reservoir to the brake cylinder device and the release of fluid under pressure from said brake cylinder device to an exhaust communication, and an accelerated service release valve device operative, subsequent to a brake application, in response to a rapid rate of increase in pressure in the brake pipe to cause an equalization of the pressures in the emergency reservoir and the brake pipe, the improvement comprising the combination therewith of:

(a) a graduated release valve device of the type to control release of fluid under pressure from the brake cylinder device to atmosphere via said communication, said graduated release valve device comprising:
  (i) a valve operative to open and close said communication to atmosphere, and
  (ii) movable abutment means for actuating said valve subject in opposing relation to the pressure in the emergency reservoir and the sum of the pressures in the brake pipe and in the brake cylinder device in corresponding chambers,
  (iii) said valve being operated by said movable abutment means upon equalization of the pressures in the emergency reservoir and the brake pipe to open said communication whereby an optional direct or graduated release of brakes is obtained accordingly as the pressure in the brake pipe is increased at said rapid rate or at a lesser rate.

8. Fluid pressure brake apparatus, as claimed in claim 7, further characterized by means for rendering the accelerated service release valve device non-operative whereby to cause said graduated release valve device to effect a graduated release of a brake application notwithstanding charging the brake pipe at said rapid rate.

9. Fluid pressure brake apparatus, as claimed in claim 7, further characterized by means for rendering said graduated release valve device non-operative whereby to cause the service valve device to effect a direct release of a brake application in response to charging the brake pipe at any rate.

10. Fluid pressure brake apparatus, as claimed in claim 2, further characterized by a first biasing means for normally maintaining said valve in the position to open said communication to atmosphere, and in that said movable abutment means comprises:
(a) a first movable abutment subject in opposing relation respectively to the pressure in the emergency reservoir and in the brake pipe,
(b) a second movable abutment arranged in tandem relation to said first movable abutment and subject in opposing relation respectively to atmospheric pressure and the pressure in the brake cylinder, and
(c) means impositively connecting said movable abutments to said valve, (d) said movable abutments and said impositive connecting means cooperating with said valve whereby said valve is respectively operable to close said communication in response to a reduction in the pressure in the brake pipe and to open said communication in response to a subsequent increase in the pressure in the brake pipe.

11. Fluid pressure brake apparatus, as claimed in claim 1, in which said graduated release valve device is embodied in a casing section that constitutes one of a number of sectionalized casing sections of the service valve device.

12. Fluid pressure brake apparatus of the type having a normally charged brake pipe the reduction of fluid pressure in which initiates a brake application, an auxiliary reservoir and an emergency reservoir each normally charged with fluid at the pressure carried in the brake pipe, a brake cylinder device, and a service valve device for controlling the supply of fluid under pressure from the auxiliary reservoir to the brake cylinder device and the release of fluid under pressure from said brake cylinder device to an exhaust communication, the improvement comprising the combination therewith of a graduated release valve device of the self-lapping type interposed in said exhaust communication and operative to control release of fluid under pressure from the brake cylinder device to atmosphere via said communication, said graduated release valve device having:
  (a) a valve operative to open and close said communication to atmosphere, and
  (b) movable abutment means for actuating said valve subject in opposing relation to the pressure in the emergency reservoir and the sum of the pressures in the auxiliary reservoir and in the brake cylinder device in corresponding chambers,
  (c) said valve being actuated to its closed position in response to a reduction in the pressure in the auxiliary reservoir incidental to effecting a brake application, and actuated to its open position in response to a subsequent increase in the pressure in the auxiliary reservoir to cause a reduction of pressure in the brake cylinder device corresponding to said increase in the pressure in the auxiliary reservoir.

13. Fluid pressure brake apparatus, as claimed in claim 12, further characterized in that said movable abutment means comprises:
  (a) a first movable abutment subject on its opposite sides respectively to emergency reservoir pressure and to auxiliary reservoir pressure, and
  (b) a second movable abutment having a smaller effective area than and arranged in tandem relation to said first movable abutment on the side thereof that is subject to the pressure in the auxiliary reservoir,
  (c) said second movable abutment being subject on its side adjacent said first movable abutment to atmospheric pressure and on its opposite side to brake cylinder pressure, and operative jointly with said first movable abutment to effect opening of said valve in response to an increase in the pressure in the auxiliary reservoir subsequent to effecting a brake application to cause release of fluid under pressure from the brake cylinder device and said opposite side of said second movable abutment to atmosphere via said communication.

14. Fluid pressure brake apparatus, as claimed in claim 2, in which said graduated release valve device is embodied in a first casing section and said charging control valve device is embodied in a second casing section, said pair of casing sections constituting two of a number of sectionalized casing sections of the service valve device.

15. Fluid pressure brake apparatus, as claimed in claim 1, further characterized by means for optionally substituting auxiliary reservoir pressure for brake pipe pressure in the corresponding chamber of said graduated release valve device, the character of operation of said graduated release valve device remaining unchanged.

References Cited
UNITED STATES PATENTS

| | | | |
|---|---|---|---|
| 2,926,965 | 3/1960 | Wilson et al. | 303—36 |
| 3,208,801 | 9/1965 | McClure | 303—36 |

DUANE A. REGER, *Primary Examiner.*

U.S. Cl. X.R.
303—74